(12) United States Patent
Olson

(10) Patent No.: US 6,531,613 B1
(45) Date of Patent: Mar. 11, 2003

(54) THIOXANTHONE DYES WITH IMPROVED SOLUBILITY

(75) Inventor: David B. Olson, Marine on St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/934,174

(22) Filed: Aug. 20, 2001

(51) Int. Cl.[7] ............................................. C07D 335/12
(52) U.S. Cl. ...................................................... 549/41
(58) Field of Search ............................................. 549/41

(56) References Cited

U.S. PATENT DOCUMENTS

| | | |
|---|---|---|
| 3,356,687 A | 12/1967 | Fuchs et al. |
| 3,785,989 A | 1/1974 | Noetzel et al. |
| 3,828,072 A | 8/1974 | Spietschka et al. |
| 3,829,439 A | 8/1974 | Spietschka et al. |
| 4,036,859 A | 7/1977 | Ribaldone et al. |
| 4,116,923 A | 9/1978 | Gattner et al. |
| 5,280,128 A | 1/1994 | Ribaldone et al. |
| 5,415,669 A | 5/1995 | Buhler et al. |

FOREIGN PATENT DOCUMENTS

| | | |
|---|---|---|
| DE | A 2815031 | 10/1979 |
| IT | 1061813 | 4/1983 |
| JP | 10308278 | 11/1998 |
| JP | 10312885 | 11/1998 |
| WO | WO 90/01526 | 2/1990 |

OTHER PUBLICATIONS

Moore, J.A. (ed.), *Macromolecular Syntheses*, 1977, vol. 1, pp. 17–21.
Carlini et al., Dyes and Pigments, *New Daylight Fluorescent Pigments*, 1982, vol. 3, pp. 59–69.

*Primary Examiner*—Joseph K. McKane
*Assistant Examiner*—Andrea D. Small
(74) *Attorney, Agent, or Firm*—Carolyn A. Fischer

(57) ABSTRACT

Described are novel branched 6-alkoxy-14H-anthra[2,1,9-mna]thioxanthene-14-one compounds which are dyes with excellent fluorescent properties and improved solubility characteristics.

6 Claims, No Drawings

THIOXANTHONE DYES WITH IMPROVED SOLUBILITY

FIELD OF THE INVENTION

The present invention relates to new thioxanthone compounds having utility as fluorescent dyes. The dyes are useful in films and coating for various articles including, for example, traffic signs.

BACKGROUND OF THE INVENTION

Benzothioxanthene compounds are known for imparting color to certain plastic materials such as polymethylmethacrylate, polycarbonate, polystyrene, and polyester. The compounds are described, for example, in FR 2,124,384, DE-A 2,613,493, DE-A 2,815,031, IT 1,061,813 and in Dyes and Pigments Vol. 3 (1982), pp. 59–69. Their preparation is described in DE-B 2,134,517 and DE-B 2,134,518.

In particular, 14H-anthra[2,1,9-mna]thioxanthene-14-one compounds are described by Carlini et al. in Dyes and Pigments Vol. 3 (1982), pp. 59–69. One known photostable fluorescent colorant described by Carlini is 6-methoxy-14H-anthra[2,1,9-mna]thioxanthene-14-one. However, this colorant has the disadvantage of being poorly soluble in many of the polymers used to make coating and films for traffic sheeting. There is a need to find colorants of similar color and photostability with improved solubility.

SUMMARY OF THE INVENTION

The present invention provides new 14H-anthra[2,1,9-mna]thioxanthene-14-one compounds that are fluorescent colorants with improved solubility characteristics, good photodurability, and which can be made commercially at reasonable costs.

Accordingly, the present invention includes compounds of the formula

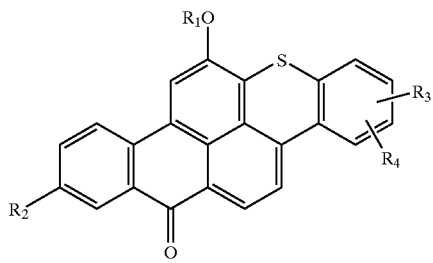

I wherein $R_1$ is a branched alkyl group having from 3 to 22 carbon atoms; $R_2$, $R_3$ and $R_4$ are each, independently, hydrogen or alkyl having from 1 to 4 carbon atoms.

The compounds of formula I are useful as fluorescent dyes in various articles and in particular retroreflective sheeting for traffic signs.

DETAILED DESCRIPTION OF THE INVENTION

Definitions

As referred to herein, the term "colorant" shall mean pigments and/or dyes or other substances used to impart hue and chroma and value to an article.

As referred to herein, the term "conventional colorant" or "ordinary colorant" are used interchangeably and shall mean colorants which do not exhibit fluorescent properties.

As referred to herein, the term "dye" shall mean substances which impart color to a substrate by selective absorption of light. Dyes are soluble and/or go through an application process which, at least temporarily, destroys any crystal structure of the color substances. Dyes are retained in the substrate by absorption, solution, and mechanical retention, or by ionic or covalent chemical bonds.

As referred to herein, the term "fluorescent dye" shall mean a dye which absorbs light at a first wavelength and emits light at a second wavelength which is longer than the first wavelength.

As used herein, the term "fluorescent pigment" refers to a particle which includes one or more fluorescent dyes in a polymer matrix of a polycarbonate, a polyester or a mixture thereof. The particle may be of any size and shape depending on the desired use.

As used herein, the term "equivalent diameter" shall mean the size that passes a rectangular opening in a screen of that dimension.

The luminance factor (CIE tristimulus value Y) is a standard measure of the amount of light (electromagnetic radiant power that is visually detectable by the normal human observer) radiating from a surface weighted by the eye's efficiency to convert the light to luminous sensation. It is defined as the ratio of the total luminance of a specimen to that of a perfect diffuse reflector illuminated and viewed under the same conditions. For a fluorescent material, the luminance factor is the sum of two quantities, the reflected luminance factor ($Y_R$) and the fluorescence luminance factor ($Y_F$). The fluorescence luminance factor ($Y_F$) is the ratio of the fluorescence luminance (luminance due to emitted light) of the specimen to the luminance reflected by a perfect diffuser similarly illuminated and viewed. Under any specified conditions of illumination and viewing $Y=Y_R+Y_F$. It is the existence of fluorescence luminance ($Y_F>0$) which differentiates fluorescent color specimens from their non-fluorescent counterparts and other non-fluorescent high luminance colored materials. The fluorescence luminance factor ($Y_F$) measured under specified illumination and viewing conditions is a measure of a material's efficiency to convert absorbed electromagnetic radiant power into luminous sensation. The daytime chromaticity (x,y), total luminance factor ($Y_T$), and fluorescence luminance factor ($Y_F$) calculated for the CIE D65 and the CIE 1931 observer can be determined with a Labsphere BFC-450 Bispectral Colorimeter commercially available from Labsphere, North Sutton, N.H.

The present invention provides novel benzothioxanthone compounds, particularly 6-branched chain alkoxy-14H-anthra[2,1,9-mna]thioxanthene-14-one. The compounds are of formula I

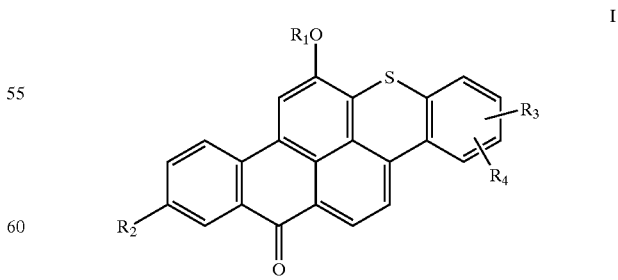

I wherein $R_1$ is a branched alkyl group having from 3 to 22 carbon atoms; $R_2$, $R_3$ and $R_4$ are each, independently, hydrogen or alkyl having from 1 to 4 carbon atoms. The term "branched alkyl group" refers to a linear hydrocarbon chain which has at least one subordinate hydrocarbon chain on one or more of the carbon atoms of the primary chain. The above compounds of the present invention are photostable fluorescent dyes having a fluorescence luminance, $Y_F$, greater than 3, preferably greater than about 8 and more preferably greater than about 12. The compounds have improved solubility characteristics and are soluble in a variety of solvents and polymer matrices. The compounds are used to provide articles, films, coatings and the like.

The compounds of formula I are predominantly red in color when used alone in the absence of other colorants. Preferred compounds of formula I include those where $R_2$, $R_3$ and $R_4$ are hydrogen; more preferred are those wherein $R_1$ is a branched $C_5$- to $C_{12}$-alkyl group with $C_8$- and $C_9$-alkyl groups being most preferred. Particularly valuable dyes of the present invention are 6-[(2-ethylhexyl)oxy]-14H-anthra[2,1,9-mna]thioxanthene-14-one and 6-(1-isobutyl-3-methylbutoxy)-14H-anthra[2,1,9-mna]thioxanthene-14-one.

The compounds of formula I may be prepared by known methods. By way of illustration, the following schematic diagram shows a method of making 14H-anthra[2,1,9-mna]thioxanthene-14-one compounds wherein $R_1$ is a branched alkyl group.

Schematic A

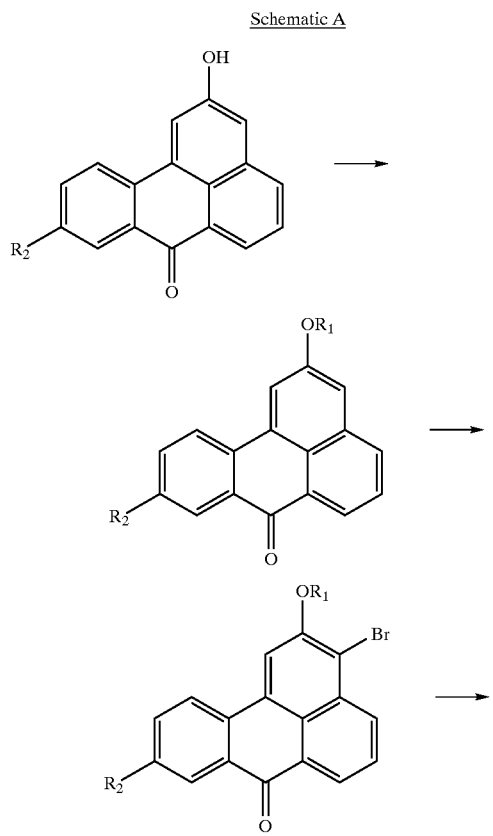

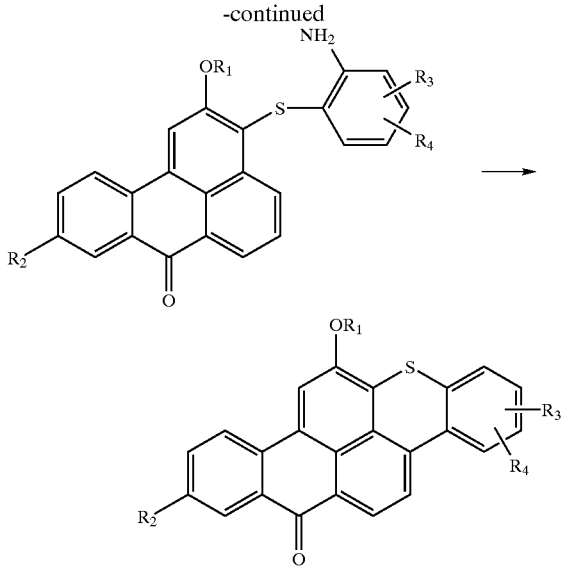

Generally, a 2-hydroxybenzanthrone may be alkylated with an alkyl halide in the presence of sodium or potassium carbonate in a polar-aprotic solvent to provide the desired 2-alkoxy compound. Bromination of the alkoxy compound with n-bromo succinimide (NBS) provides the neighboring 3-bromo substituent which is then reacted with ortho-amino thiophenol at reflux in a polar-aprotic solvent such as, for example, dimethylformamide (DMF). The product is then ring-closed by treatment with hydrochloric acid, followed by reaction with sodium nitrite and then addition of a copper sulfate catalyst.

The above-described synthesis of the compounds of the present invention employs 2-oxybenzanthrones as starting materials. These starting materials can be made as described in U.S. Pat. No. 4,036,859, which patent is incorporated herein by reference.

The compounds of the present invention as fluorescent dyes may be used in a variety of ways in producing a variety of articles, laminates, pigments, articles containing pigment particles with a binder, and coating compositions for various non-retroreflective and retroreflective films, sheeting and articles. A particular use of these dyes is in traffic signage.

Compounds of the present invention may thus be admixed by blending or extruding with a polymer matrix to form various articles. The polymer matrix serves as the host for the dye and other optional adjuvants, as desired. The solubility of the compounds in the polymer matrix provides the advantage of compatibility with the polymer matrix, in addition to photostablility and effective color. The amount of compound, hereinafter, dye, may vary from about 0.01 to about 10 wt-% of the polymer matrix.

The polymer matrix includes a polymer or copolymer that can be formed into a sheet. Suitable polymers include polyester, unsaturated polyester, polycarbonate, polyolefin, polyvinyl chloride, polyurethane, polyacrylate or polymethylmethacrylate polymers and copolymers. The polymer can be a thermoplastic or thermoset resin. The polymer can be in the form of a powder, pellet or bead into which the dye can be easily and substantially uniformly dispersed.

A fluorescent article comprising a compound of the present invention may be in any form and is preferably in the form of sheets or in the form of particles. The sheets can be made from the polymer and dye mixture by compression molding, casting, calendaring, extruding and the like. The thickness of the sheets may vary from about 10 to 1,000 microns. The sheet may be substantially flat on both sides or have cube-corner retroreflective elements embossed on one side.

The fluorescent article in the form of a sheet may be laminated to a substrate, for example, a retroreflective substrate. The laminate may be formed by thermally fusing the sheet to the substrate or by interposing an adhesive layer between the sheet and the substrate. The adhesive should not substantially affect the color or luminance of the laminate. A suitable adhesive is a transparent acrylic adhesive.

Alternatively or in addition thereto, the composition comprising the polymer matrix and the compounds of formula I may be in the form of pigment particles. The durable pigment may be either (1) non-retroreflective, or (2) structured so as to be retroreflective.

The pigment includes particles of a variety of shapes, including spherical, platelets such as may result from fracturing thin films and sheets, flakes, fibrous, and odd shapes. Since shape may vary so widely, a useful measure of pigment size is to measure in terms of equivalent diameter, or the size that passes a rectangular opening in a screen of that dimension. Since the shape may vary so widely, the equivalent diameter of the fluorescent pigment may also vary over a wide range depending on the desired effect. A preferred range of equivalent diameter is from about 0.01 to about 5 mm.

The pigment is preferably sufficiently durable for pavement markings, with some embodiments having the ability to be flame processed without loss of fluorescence. The combination of the durable pigment with a suitable binder results in durable articles having conformability and/or other selected desirable features. The pigment particles may be mixed with other particles, such as retroreflective elements and anti-skid particles. Disposal of pigment onto only a portion of the viewing surface of a binder or of a sheet results in more efficient use of the expensive dye.

When it is desired that the pigment particle be retroreflective, the pigment may include retroreflective elements including microspheres and microstructured elements. These result from fracturing retroreflective sheets. The pigment may also be made from waste or rejected production scrap resulting from the manufacture of fluorescent prismatic retroreflective sheeting.

Generally, retroreflective materials include a monolayer of optical elements typically in the form of glass microspheres (i.e., beads). These microspheres can be embedded in a polymeric binder layer or pressed into a polymeric film, for example. Alternatively, the retroreflective materials can include prismatic-type optical elements. Such materials are well known to those of skill in the art.

Alternatively, or in addition thereto in any combination, the compounds of the present invention may also be used in coating compositions. The coating composition is obtained by combining a compound of formula I, a film forming resin and a solvent in which both the compound and the resin are soluble. The composition is applied as a coating to a substrate by any suitable method such as a wire wound draw down bar, silk screen, spray, gravure, doctor blade, roll coater and the like. The coating may be applied to uniformly cover the substrate or as indicia on the substrate to communicate information. In one embodiment, the substrate is retroreflective sheeting having a white or silvery white color. Although other colored substrates are permitted by the invention, a white substrate tends to maximize the luminance of the coated object. Representative pigments are found in U.S. Pat. No. 5,272,562, incorporated herein by reference.

The compounds of formula I are preferably co-soluble with a film forming resin and provide a coating having a fluorescence luminance factor of greater than 3. The dye content with respect to the resin content of the invention is not less than about 0.01 wt-% of the film-forming resin. The amount of dye for a particular use is readily determined by its ability to form a solution with the film forming resin and by luminance of the coatings made therefrom. One skilled in the art will recognize that the actual amount of dye chosen will depend upon variables relating to the intended final use of the invention. If the dye content is too low, luminance may fall outside of the parameters of the invention. If the dye content is too great, the dye may tend to become self quenching of fluorescence and fail to meet the luminance requirement.

The film forming resin component may be an acrylic resin, a polyester resin a vinyl resin, a polyacrylate polymer or copolymer (e.g. polymethylmethacrylate) or mixtures thereof. The resin forms a film after applying the coating composition to the surface of a substrate and evaporating the solvent. The film forming resin provides a matrix to bind the fluorescent red dye to the substrate.

The coating composition also includes a solvent. The solvent may be a single solvent or a blend of solvents. Suitable solvents are those which dissolve the dye and the resin and provide a coating with the defined luminance parameters. Solvents include dipropyleneglycol monomethylether acetate commercially available from Dow Chemical, Co., Midland Mich. under the trade designation "Dowanol DPMA", methylisobutyl ketone (MIBK), methylethylketone (MEK), diisobutyl ketone (DIBK), acetone, toluene and mixtures thereof.

The coating composition may be applied directly to the retroreflective substrate, or it may be applied, for example, to a clear carrier sheet which is then laminated to the substrate. The carrier sheet or film may be a polyurethane, polyvinyl chloride, a polyester, an unsaturated polyester or acrylic polymer or copolymer film, typically having a thickness of about 50 microns to 75 microns, and may be supported, for example, by a backing film. The carrier sheet or film may be thermoplastic or thermoset resin and the backing film may be a polyethylene coated paper or a polyester film. The composition may be applied substantially uniformly across the entire surface of the carrier sheet or in the form of indicia. Solvent may be evaporated from the coating by conventional means to provide a coating substantially free of solvent.

The carrier sheet having a fluorescent coating may then be laminated to an adhesive coated reflective or retroreflective sheet or to an adhesive coated release liner having a reflective or retroreflective surface. The liner may be paper, polyester or polyolefin and coated with a silicone release agent on the side of the liner in contact with the adhesive. The release liner protects the adhesive layer and facilitates handling of the carrier sheet prior to use. The release liner can be stripped from the coated carrier sheet leaving the adhesive on the carrier sheet. The carrier sheet can then be adhered to a rigid material such as aluminum sheeting suitable for signage.

The carrier sheet having a fluorescent coating may be applied, for example, to a polycarbonate film having cube corner retroreflective elements on one surface. If the carrier sheet has a backing film, the film may be removed and the coated surface of the carrier sheet hot laminated to the surface of the polycarbonate film opposite the surface having the cube corner structure. Alternatively, the backing sheet may be removed after the laminate has been formed. The carrier sheet/polycarbonate laminate may be affixed to a rigid substrate with an adhesive to provide a fluorescent red article such as a stop sign. A retroreflective layer may be applied to the coating side of the carrier sheet before laminating the carrier sheet to the substrate, or the retroreflective layer may be applied to the rigid substrate and the fluorescent side of the carrier sheet laminated to the retroreflective layer of the substrate. The carrier sheet also may provide an overlay film to protect the coated reflective substrate from the weather when used in an outdoor environment.

Retroreflective materials (also referred to as sheeting) of the present invention may be, for example, "beaded sheeting" in the form of an enclosed-lens sheeting, embedded-lens sheeting, or encapsulated-lens sheeting, as well as cube corner retroreflective sheeting. Such articles are described, for example, in U.S. Pat. Nos. 2,407,680; 4,511,210; 4,950, 525; 3,190,178; 4,025,159; 4,896,943; 5,064,272; 5,066, 098; 3,684,348; 4,801,193; 4,895,428; and 4,938,563.

These types of sheetings are commercially available from Minnesota Mining and Manufacturing Company ("3M"), St. Paul, Minn. under the trade designations "Scotchlite Diamond Grade LDP Retroreflective Sheeting Series 3970" and "Scotchlite Diamond Grade VIP Reflective Sheeting Series 3990", "Scotchlite Engineer Grade Reflective Sheeting" and "Scotchlite High Intensity Grade Reflective Sheeting".

Regardless of whether the compound of formula I is combined with a polymeric matrix in the form of a sheet or pigment particle, the pigment particle is further dispersed within a binder, or the compound of formula I is combined with a film forming resin and solvent to form a coating composition, each of these compositions may further comprise other adjuvants. Such additional adjuvants include one or more colorants, light stabilizers, ultraviolet (UV) absorbers, antioxidants, and other additives to improve the durability of the dye in the polymeric matrix or processing aids such as antiblocking agents, releasing agents, lubricants, etc.

The fluorescent dye of formula I may be used alone or in combination with one or more additional colorants. Colorants that may be added to the compounds of formula I include other fluorescent dyes including other thioxanthone dyes, such as C.I. Solvent Yellow 98, thioindigoid dyes, such as C.I. Vat Red 41, a naphthalamide dye, such as C.I. Solvent Yellow 43, a benzoxazole coumarin dye, such as C.I. Solvent Yellow 160:1, a perylene imide dye, such as commercially available from BASF Aktiengesellschaft, Ludwigshafen, Germany under the trade designation "Lumogen F Orange 240", a perylene dye, such as C.I. Solvent Green 5, or an isovaleranthrone dye, such as C.I. Pigment Violet 31.

The articles of the invention may further comprise a protective layer or overlay. Such protective layers typically form an exterior side to the laminate. The overlay may be made from the same polymeric resin as the fluorescent sheet. The overlay may be transparent and may contain UV light absorbing materials to protect the laminate from the adverse effect of exposure to sunlight. The UV light absorbing substance may be incorporated into the overlay rather than into the fluorescent coating as the UV light absorbing substance may adversely affect fluorescence if dispersed in the same matrix as the fluorescent dye. The overlay also protects the laminate from deleterious effects of weather, ozone and other environmental contaminants. The overlay may be attached to the fluorescent sheet by adhesive or by co-extrusion during formation of the fluorescent sheet. Typically, the overlay is disposed on a backing film and the fluorescent coating is then applied as described above. However, the overlay may be applied to the fluorescent coating after the article is formed.

Objects and advantages of the invention are further illustrated by the following examples, but the particular materials and amounts thereof recited in the examples, as well as other conditions and details, should not be construed to unduly limit the invention. All parts, percentages and ratios herein are by weight unless otherwise specified.

EXAMPLES

Example 1

6-[(2-Ethylhexyl)oxy]-14H-anthra[2,1,9-mna] thioxanthene-14-one

A. Preparation of 2-[(2-ethylhexyl)oxy]-7H-benzo [de]anthracene-7-one

A 500 ml three neck flask was equipped with a mechanical stirrer, heating mantle and condenser. To the flask was added 25 g 2-hydroxy-7H-benzo[de]anthracene-7-one, 18 g powdered potassium carbonate, 25 g 2-ethylhexyl bromide and 250 g dimethylformamide (DMF). The mixture was heated to reflux. After seven hours, 4.5 g 2-ethylhexyl bromide was added and the mixture heated at reflux for an additional three hours. The mixture was then cooled to room temperature and 500 g deionized water was added. The solution was extracted twice with 200 g chloroform. The organic layers were combined and washed twice with 250 g water. The solvent was removed on a rotary evaporator, then the crude product was passed through a flash silica gel column using methylene chloride as the elutant. The product fractions were collected and the solvent removed using a rotary evaporator. The yield of 2-[(2-ethylhexyl)oxy]-7H-benzo [de]anthracene-7-one was 28.5 g.

B. Preparation of 3-bromo-2-[(2-ethylhexyl)oxy]-7H-benzo[de]anthracene-7-one

A 500 ml three neck round bottom flask was equipped with a mechanical stirrer, heating mantle and condenser. To the flask was added 28.5 g 2-[(2-ethylhexyl)oxy]-7H-benzo [de]anthracene-7-one, 15 g N-bromosuccinimide and 160 g DMF. The mixture was agitated well, heated to 50° C. and held at 50° C. for two hours. The mixture was cooled to 0° C. and, after several hours, the mixture was filtered to recover the solid product. The solid was suspended in 250 g water, stirred well and filtered. The yellow solid product was dried in a 50° C. oven for ten hours to give 27.1 g of 3-bromo-2-[(2-ethylhexyl)oxy]-7H-benzo[de]anthracene-7-one with melting point of 85–88° C.

C. Preparation of 3-[(2-aminophenyl)thio]-2-[(2-ethylhexyl)oxy]-7H benzo[de]anthracene-7-one A 250 ml three neck round bottom flask was equipped with a mechanical stirrer, heating mantle and condenser. To the flask was added 27 g of 3-bromo-2-[(2-ethylhexyl)oxy]-7H-benzo[de]anthracene-7-one, 5.0 g sodium carbonate, 8.5 g 2-aminothiophenol and 80 g DMF. The mixture was agitated well, heated to 120–130° C., and held at 120–130° C. for three hours. Sodium carbonate (1.0 g) and 1.2 g 2-aminothiophenol were added and the mixture heated for an additional one hour. The reaction mixture was cooled to 25° C. and 250 g of water were added. The reaction mixture was extracted twice with 200 g chloroform. The organic layers were combined and washed twice with 250 g water. The solvent was removed on a rotary evaporator, then the crude product was passed through a flash silica gel column using methylene chloride as the elutant. The product fractions were collected and the solvent removed using a rotary evaporator. The yield of semi-solid 3-[(2-aminophenyl) thio]-2-[(2-ethylhexyl)oxy]-7H-benzo[de]anthracene-7-one was 27.5 g.

D. Preparation of 6-[(2-ethylhexyl)oxy]-14H-anthra [2,1,9-mna]thioxanthene-14-one A one liter three neck round bottom flask was equipped with a mechanical stirrer, additional funnel, thermometer and condenser. To the flask was added 27.5 g of 3-[(2-aminophenyl)thio]-2-[(2-ethylhexyl)oxy]-7H-benzo[de] anthracene-7-one and 400 g DMF. The reaction mixture was cooled with a dry ice bath to 0° C. and 63 g con. HCl was added, keeping the reaction temperature below 10° C. While this addition was taking place, 4.2 g sodium nitrite were dissolved in 10 g water. The reaction mixture was cooled to 0° C. and the sodium nitrite in water was added slowly, keeping the reaction temperature below 5° C. After completing the addition, the reaction was stirred for three hours while the temperature was held at 0° C. or less.

Copper (II) sulfate (0.4 g) was added to the reaction and heating of the reaction mixture was begun. As the cyclization occurred, nitrogen gas was evolved and a mild exotherm occurred. The reaction was heated to 100° C. and stirred well at 100° C. for two hours. The reaction was cooled to 25° C. and filtered. The solid which was collected was slurried with 500 g water and mixed well while heating to 60° C. The resultant mixture was filtered, then the solids dried in a 50° C. oven for ten hours to give 17 g of 6-[(2-ethylhexyl)oxy]-14H-anthra[2,1,9-mna]thioxanthene-14-one with a melting point of 175–177° C. Carbon 13 nuclear magnetic resonance (13C NMR) spectroscopy showed the product was the desired dye molecule.

Example 2

6-(1-Isobutyl-3-methylbutoxy)-14H-anthra[2,1,9-mna]thioxanthene-14-one

A. Preparation of 1-isobutyl-3-methylbutyl methanesulfonate

In a one liter three-neck flask was mixed 100 g (0.69 moles) of 2,6-dimethyl-4-heptanol and 580 g chloroform. Triethylamine (77.1 g; 6 moles) was added and the reaction mixture cooled to 0° C. Methanesulfonyl chloride (83.4 g; 0.73 moles) was added dropwise, keeping the reaction temperature about 0° C. After holding at about 0° C. for one hour, gas chromatograph (GC) showed less than 5% residual alcohol.

The reaction was warmed to room temperature, then filtered to remove insolubles. The filtrate was washed with 500 g de-ionized water. The organic layer was separated and dried over magnesium sulfate. The magnesium sulfate was removed and the solvent evaporated on a rotary evaporator to give 170 g of yellow oil, which was used as such in the next step.

B. Preparation of 2-(1-isobutyl-3-methylbutoxy)-7H-benzo[de]anthracene-7-one A 500 ml three neck flask was equipped with a mechanical stirrer, heating mantle and condenser. To the flask was added 50 g (0.20 mole) 2-hydroxy-7H-benzo[de]anthracene-7-one and 740 g dry DMF. To the flask was added 8.9 g (0.22 mole) sodium hydride (60% dispersion in mineral oil). After the bubbling subsided, 45 g (0.20 mole) of 2-(1-isobutyl)-3-methylbutyl methanesulfonate were added. The mixture was heated to 90° C. and held at 90° C. for three hours. Thin layer chromatography (TLC) showed some residual starting material. The reaction was cooled to 25° C. and 6 g of the sodium hydride in mineral oil and then 25 g of 2-(1-isobutyl)-3-methylbutyl methanesulfonate were added and the mixture heated at 95° C. for three hours. The mixture was cooled to room temperature and again 6 g of the sodium hydride mixture and then 25 g of 2-(1-isobutyl)-3-methylbutyl methanesulfonate were added and the mixture again heated at 95° C. for three hours. TLC showed no residual starting 2-hydroxy-7H-benzo[de]anthracene-7-one. Most of the DMF was removed from the reaction mixture using heat and vacuum, then 300 g deionized water and 500 g chloroform were added. The layers were separated and then the aqueous layer was extracted with 200 g chloroform. The organic layers were combined and washed twice with 250 g water. The crude product was passed through a short silica gel column to remove some dark impurities. The solvent was removed using a rotary evaporator. The yield was 45 g of a dark brown oil that was used as such in the next step.

C. Preparation of 3-bromo-2-(1-isobutyl-3-methylbutoxy)-7H-benzo[de]anthracene-7-one A 500 ml three neck round bottom flask was equipped with a mechanical stirrer, heating mantle and condenser. To the flask was added 45 g (0.12 mole) of 2-(1-isobutyl-3-methylbutoxy)-7H-benzo[de]anthracene-7-one, 23.6 g (0.13 mole) N-bromosuccinimide and 265 g DMF. The mixture was agitated well, heated to 50° C. and held at 50° C. for two hours. Some of the DMF was stripped from the reaction using heat and vacuum and then 300 g chloroform were added to the flask. The resulting solution was washed three times with 250 g deionized water. The solvent was removed using a rotary evaporator; the yield was 52.5 g of a dark brown oil.

D. Preparation of 3-[(2-aminophenyl)thio]-2-(1-isobutyl-3-methylbutoxy)-7H-benzo[de]anthracene-7-one A 500 ml three neck round bottom flask was equipped with a mechanical stirrer, heating mantle and condenser. To the flask was added 52.5 g (0.11 mole) of 3-bromo-2-(1-isobutyl-3-methylbutoxy)-7H-benzo[de]anthracene-7-one (4), 9.2 g (0.087 mole) sodium carbonate, 16.0 g (0.13 mole) 2-aminothiophenol and 170 g DMF. The mixture was agitated well and heated at 120–130° C. for three hours. The reaction was cooled to 25° C. and 300 g water was added. The reaction mixture was extracted twice with 250 g chloroform. The organic layers were combined and washed twice with 250 g water. The solvent was removed on a rotary evaporator. The yield of crude product was 55 g of a dark brown oil which was used as such in the next step.

E. Preparation of 6-(1-isobutyl-3-methylbutoxy)-14H-anthra[2,1,9-mna]thioxanthene-14-one A one liter three neck round bottom flask was equipped with a mechanical stirrer, addition funnel, thermometer and condenser. To the flask was added 55 g of 3-[(2-aminophenyl)thio]-2-(1-isobutyl-3-methylbutoxy)-7H-benzo[de]anthracene-7-one and 400 g DMF. The reaction was cooled to 0° C. with a dry ice bath and 133 g con. HCl were added, keeping the reaction temperature below 10° C. While this addition was taking place, 8.4 g sodium nitrite were dissolved in 20 g water. The reaction mixture was cooled to 0° C. and the sodium nitrite in water added slowly, keeping the reaction temperature below 5° C. After completing the addition, the reaction was stirred for three hours while keeping the temperature at 0° C. or less.

Copper (II) sulfate (1.0 g) was added to the reaction and heating of the reaction mixture was begun. As the cyclization occurred, nitrogen gas was evolved and a mild exotherm occurred. The reaction mixture was heated to reflux and stirred well at reflux for three hours. The reaction mixture was cooled to 25° C. and then some of the DMF was removed using vacuum and heat. To the residue was added 300 g chloroform and the layers separated. The aqueous layer was extracted with another 300 g chloroform. The chloroform extracts were combined, washed tree times with 250 g deionized water. The solution of the crude product in chloroform was passed through a flash chromatography column using additional chloroform as the elutant. The product fractions were combined and the solvent removed on a rotary evaporator. To the dry residue was added 200 g hexanes and the solid filtered to collect the red solid product. The yield of 6-(1-isobutyl-3-methylbutoxy)-14H-anthra[2,1,9-mna]thioxanthene-14-one was 9.5 g. The melting point of the solid was 213–214° C. 13C NMR showed that the product was 90–95% pure and was the desired dye molecule.

Examples 3–4 and Comparative Example A

Examples 3–4 and Comparative Example A were prepared by placing 60–100 mg of each of the compounds of Examples 1–2 and 6-methoxy-14H-anthra(2,1,9-mna)thioxanthene-14-one (described by Carlini et al.) in a vial with 5.0 ml acetone. The vials were allowed to stand at room temperature (RT) for 72 hours, at which time each vial had a substantial amount of solid dye remaining. Each vial was hand shaken and the solution was filtered using a 0.45 micron polytetrafluoroethylene (PTFE) filter commercially available from VWR Scientific Products, West Chester, Pa. under the trade designation "Acrodisc 13CR PTFE".

The amount of fluorescent dye in the saturated acetone solution was determined by measuring the major dye absorption band at 535 nm using a UV-Vis Spectrophotometer commercially available from Shimadzu Scientific Instruments, Inc., Columbia, Md. under the trade designation "Shimadzu model UV-2401PC". Dye concentrations were calculated by measuring the absorbance of the saturated acetone solution, and then diluting that solution until absorbance of the resulting solution was below 3. The dyes were assumed to have equal absorbance per mole. Using the dilution and an absorbance coefficient of 16,100 A/mol/L (coefficient obtained in acetone for the dye of Example 2) and assuming a Beer's Law relationship, the concentration of dye in each saturated solution was calculated and is set out in TABLE I.

The data in TABLE I show the improved solubility in acetone of Examples 3 and 4 relative to that of Comparative Example A [6-methoxy-14H-anthra(2,1,9-mna)thioxanthene-14-one].

TABLE I

| Ex. No. | Dye of Ex. No. | Dye Concentration in Acetone at RT (mg/ml) |
|---|---|---|
| 3 | 1 | 0.96 |
| 4 | 2 | 2.98 |
| Comp. A | 6-methoxy-14H-anthra(2, 1, 9-mna)thioxanthene-14-one | 0.06 |

We claim:
1. A compound formula

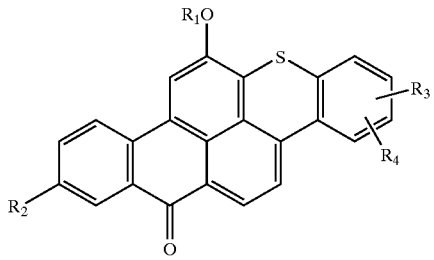

wherein $R_1$ is a branched alkyl group having from 5 to 22 carbon atoms;

$R_2$, $R_3$ and $R_4$ are each, independently, hydrogen or alkyl having from 1 to 4 carbon atoms.

2. A compound of claim 1, wherein $R_2$, $R_3$ and $R_4$ are hydrogen.

3. A compound of claim 1, wherein $R_1$ has 5 to 12 carbon atoms.

4. A compound of claim 1, wherein $R_1$ is a branched $C_8$ or $C_9$ alkyl group.

5. A compound, being 6-((2-ethylhexyl)oxy)-14H-anthra(2,1,9-mna)thioxanthene-14-one.

6. A compound, being 6-(1-isobutyl-3-methylbutoxy)-14H-anthra[2,1,9-mna]thioxanthene-14-one.

* * * * *

UNITED STATES PATENT AND TRADEMARK OFFICE
CERTIFICATE OF CORRECTION

PATENT NO.      : 6,531,613 B1                                           Page 1 of 1
DATED           : March 11, 2003
INVENTOR(S)     : Olson, David B.

It is certified that error appears in the above-identified patent and that said Letters Patent is hereby corrected as shown below:

Column 4,
Line 51, "photostablility" should read -- photostability --.

Column 6,
Line 21, insert -- , -- preceding "a".
Line 33, insert -- , -- preceding "MI".

Column 11,
Line 18, "tree" should read -- three --.

Column 12,
Line 22, insert -- of the -- following "compound".

Signed and Sealed this

Seventh Day of October, 2003

JAMES E. ROGAN
*Director of the United States Patent and Trademark Office*